United States Patent [19]
Mochizuki et al.

[11] Patent Number: 5,477,392
[45] Date of Patent: Dec. 19, 1995

[54] ELECTRICALLY POWERED FOLDABLE OUTER REARVIEW MIRROR FOR A MOTOR VEHICLE

[75] Inventors: Toshihiro Mochizuki; Naoto Iwanabe, both of Fujieda, Japan

[73] Assignee: Murakami Kaimeido Co. Ltd., Shizuoka, Japan

[21] Appl. No.: 159,439

[22] Filed: Nov. 30, 1993

[30] Foreign Application Priority Data

Mar. 24, 1993 [JP] Japan .................. 5-019095 U

[51] Int. Cl.⁶ .............. B60R 1/06; G02B 7/182
[52] U.S. Cl. .......... 359/841; 359/872; 359/877; 248/478; 248/479; 248/900
[58] Field of Search ............ 359/841, 872, 359/877; 248/476, 477, 478, 479, 483, 549, 900

[56] References Cited

U.S. PATENT DOCUMENTS

| | | | |
|---|---|---|---|
| 4,626,083 | 12/1986 | Nakayama et al. | 359/877 |
| 4,626,084 | 12/1986 | Kumai | 359/841 |
| 4,786,157 | 11/1988 | Mori et al. | 359/877 |
| 4,832,477 | 5/1989 | Torii et al. | 359/877 |
| 4,893,916 | 1/1990 | Sakuma et al. | 359/877 |
| 4,919,526 | 4/1990 | Umekawa et al. | 359/877 |
| 4,981,349 | 1/1991 | Tamiya et al. | 359/877 |
| 4,982,926 | 1/1991 | Mori et al. | 359/841 |
| 5,012,693 | 5/1991 | Enomoto et al. | 359/841 |
| 5,190,499 | 3/1993 | Mori et al. | 359/841 |
| 5,315,442 | 5/1994 | Sato et al. | 359/841 |
| 5,384,660 | 1/1995 | Oishi | 359/877 |

FOREIGN PATENT DOCUMENTS

| | | | |
|---|---|---|---|
| 0032940 | 2/1989 | Japan | 359/841 |
| 2290754 | 11/1990 | Japan . | |

*Primary Examiner*—Ricky D. Shafer
*Attorney, Agent, or Firm*—Michael J. Striker

[57] ABSTRACT

The electrically powered foldable outer rearview mirror includes a base (43); a shaft (10) mounted on the base and including a protruding cylindrical portion (11) and a flange portion (20) having a slide surface (Sa); and a frame (15) rotatably engaged on the cylindrical portion (11), the frame (15) having a root portion (24) provided with an annular-shaped sliding portion (S) bearing on the slide surface (Sa) to slide smoothly around the cylindrical portion (11). The frame is provided with an annular-shaped plate stopper element (14) in a rear surface of the root portion (24) and inside of the annular sliding portion (S). The flange portion (20) has a shaft stopper element (32) loosely engaged in an arc-shaped groove (31) provided in the frame root portion (24) and balls (13,13) accommodated in respective hemispherical apertures (12,12) provided in the flange portion (20) and located so that the balls (13,13) engage in recesses (14c) in a plate stopper element (14). The shaft (10) includes an annular rib (16) protruding from the flange portion (20) and extending coaxial to the plate stopper element (14) around an outer periphery of the sliding surface (Sa) and the rear surface of the frame root portion (24) is provided with an annular groove (17) in which the annular rib (16) engages loosely.

3 Claims, 4 Drawing Sheets

ELECTRICALLY POWERED FOLDABLE
OUTER REARVIEW MIRROR FOR A
MOTOR VEHICLE

BACKGROUND OF THE INVENTION

The present invention relates to a mechanism for rotating and driving a mirror body of an electrically powered foldable outer rearview mirror for a motor vehicle, especially to a rotating and driving mechanism for the mirror body having an improved stability and reliability.

An outer rearview mirror for a motor vehicle is known to be mounted protruding from the vehicle side and can be designed to be foldable so as not to stand in the way of parking the vehicle in a garage or the like.

A foldable outer rearview mirror system disclosed in Published Japanese Patent Application Hei 2-290754 comprises a shaft, a mirror housing rotatably supported on the shaft and a clutch means controlling the rotation of the mirror housing. The shaft includes a bottom flange portion, a cylindrical portion provided protruding from the flange portion and a pair of arc-shaped grooves provided on the flange portion at the opposite sides of the cylindrical portion.

While a bracket is provided at the bottom of the mirror housing, the surface where the mirror body is rotated and supported and a pair of semi-spherical recesses are provided on the undersurface of the bracket. Balls are retained in the semi-spherical recesses and are engaged with the arc-shaped grooves provided on the fixed surface of the flange to rotate the mirror housing around the shaft. The mirror housing is rotated by driving force means including motor and a gear means or the like. The arc-shaped groove has a predetermined step in it to determine the movement of balls.

In the system described hereinbefore, when the motor is operated to rotate the mirror housing to the backward position, the balls approach one step of the arc-shaped grooves and the motor is electrically cut off just before the balls contact with the steps. Then the driving force transmission means has gears or the like which have back-lash so as not to halt the rotation of the mirror housing simultaneously with the stop of the motor operation. The mirror housing is rotated by inertia until the balls contact with the steps.

The mirror housing is rotated to the normal position and the motor is electrically cut off just before the balls contact with the other steps of the arc-shaped grooves to rotate the mirror housing by inertia so that balls contact with the steps to halt the rotation of the mirror housing.

When the rearview mirror contacts with the stop means, balls are rotated on the fixed surface extending between the steps to locate the mirror housing at the forward position.

Instead of disconnecting the electric power supply to the motor just before balls approach to the steps, a method of connecting PTC (Positive Thermal Coefficient) element with the electric power supply line of the motor to control the motor operation is also disclosed in Published Japanese Utility Model Registration Application No. Hei 4-76196.

The PTC element has a characteristic that the resistance rapidly increases to a certain temperature range of the line so that the temperature rise of the electric power supply line is detected when balls contact with the steps to control the operation of the motor.

In a conventional system for an automatically foldable rearview mirror system:

1. the backward position and the normal position of the mirror housing are stopped by contacting a pair of balls with the steps in the arc-shaped grooves; it is difficult to achieve an even contact condition of balls with the steps even though the motor operation is stopped and the back-lash of the driving force transmission means is set aside all together, and chattering occurs at the mirror housing position;

2. the arc-shaped groove is formed on the fixed surface and permits water and foreign substance such as a dust or the like to easily become lodged therein so that balls cannot slide smoothly to stop the rotation of the mirror housing and further the stop position of the mirror housing is changed and 3. the temperature of the electric power supply line is detected by PTC element to control the motor operation so that the motor is still supplied with electric power during the increase of the temperature for a long time which is caused by the motor load; the mirror housing is inclined on the fixed surface when balls start to pass over the steps.

SUMMARY OF THE INVENTION

It is an object of the present invention to provide an electrically powered foldable outer rearview mirror for a motor vehicle in which the position of the mirror housing is stopped without chattering at the backward position and at the normal position, the arc-shaped groove is prevented from collecting external substance, and the motor operation is halted simultaneously when balls are positioned at the steps difference of the arc-shaped groove so as not to incline the mirror housing.

According to the present invention, the electrically powered foldable outer rearview mirror has a base, a shaft mounted on the base and having a cylindrical portion and a flange portion, a frame engaged with the cylindrical portion to rotate around the cylindrical portion on the shaft, a mirror body fixed on the frame and means for rotating the frame to move the mirror body between the normal state and the backward state. The frame includes a root portion formed with a protruding sliding portion, the flange portion of the shaft includes a slide surface where the protruding sliding portion of the frame surface contacts and smoothly slides to rotate the frame around the cylindrical portion. Although it is not so mounted in the present embodiment, it is possible to attach the slide portion together with the frame or to fix it by a screw or the like.

The frame includes a root portion formed with an arc-shaped groove and a plate stopper element including recesses, the shaft has a shaft stopper element loosely engaged with the arc-shaped groove of the frame and semi-spherical apertures where balls are retained therein so that the frame is rotated by means for rotating the frame between the normal position and the backward or folded back position in which side walls of recesses of the plate stopper element contacts with the above mentioned balls and the shaft stopper element contacts with a side wall of the arc-shaped groove of the frame, respectively.

The shaft includes a protruding shaft rib coaxial to the cylindrical portion. A frame groove is provided in the frame to loosely engage with the shaft rib so that the external substance is prevented from interfering with the mirror body rotation.

BRIEF DESCRIPTION OF THE DRAWING

The objects, features and advantages of the present invention will now be illustrated in more detail by the following detailed description, reference being made to the accompanying drawing in which:

FIG. 3 (b) is a detailed cross-sectional view of the rearview mirror in a backward position;

DESCRIPTION OF THE PREFERRED EMBODIMENTS

Figure 1:
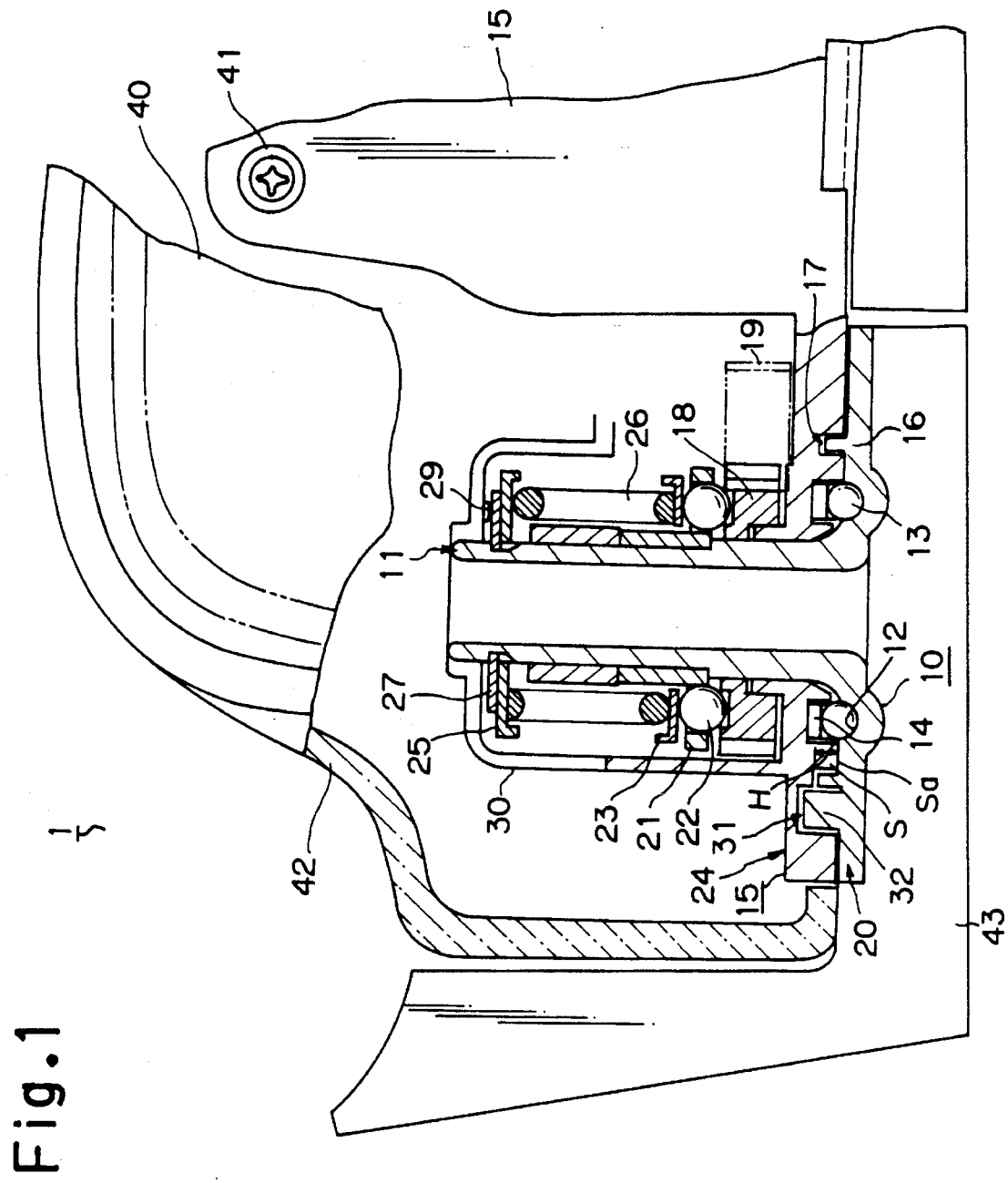
FIG. 1 is a partially cut-away cross-sectional view of an outer rearview mirror according to the invention.

An electrically powered foldable outer rearview mirror assembly for a motor vehicle according to the invention is shown in FIG. 1.

In the electrically powered foldable outer rearview mirror assembly 1 according to the invention, a shaft 10 is fixed on the base 43 and includes a flange portion 20 and a cylindrical portion 11 which is protrudes from the flange portion 20. A frame 15 is engaged with the cylindircal portion 11 and an outer plate 30 is attached to the frame 15. The frame 15 is fixed with a mirror body 42 by a screw 41 or the like.

A sliding portion S which has a certain height H, an annular groove 17 and an arc-shaped groove 31 are provided on the root portion 24 of the frame 15. The annular groove 17 is also coaxial to the cylindrical portion 11 of the shaft 10 and an annular-shaped plate stopper element 14 which has recesses 14c, 14c to guide balls 13 is fixed on the root portion 24 of the frame 15.

Figure 4:
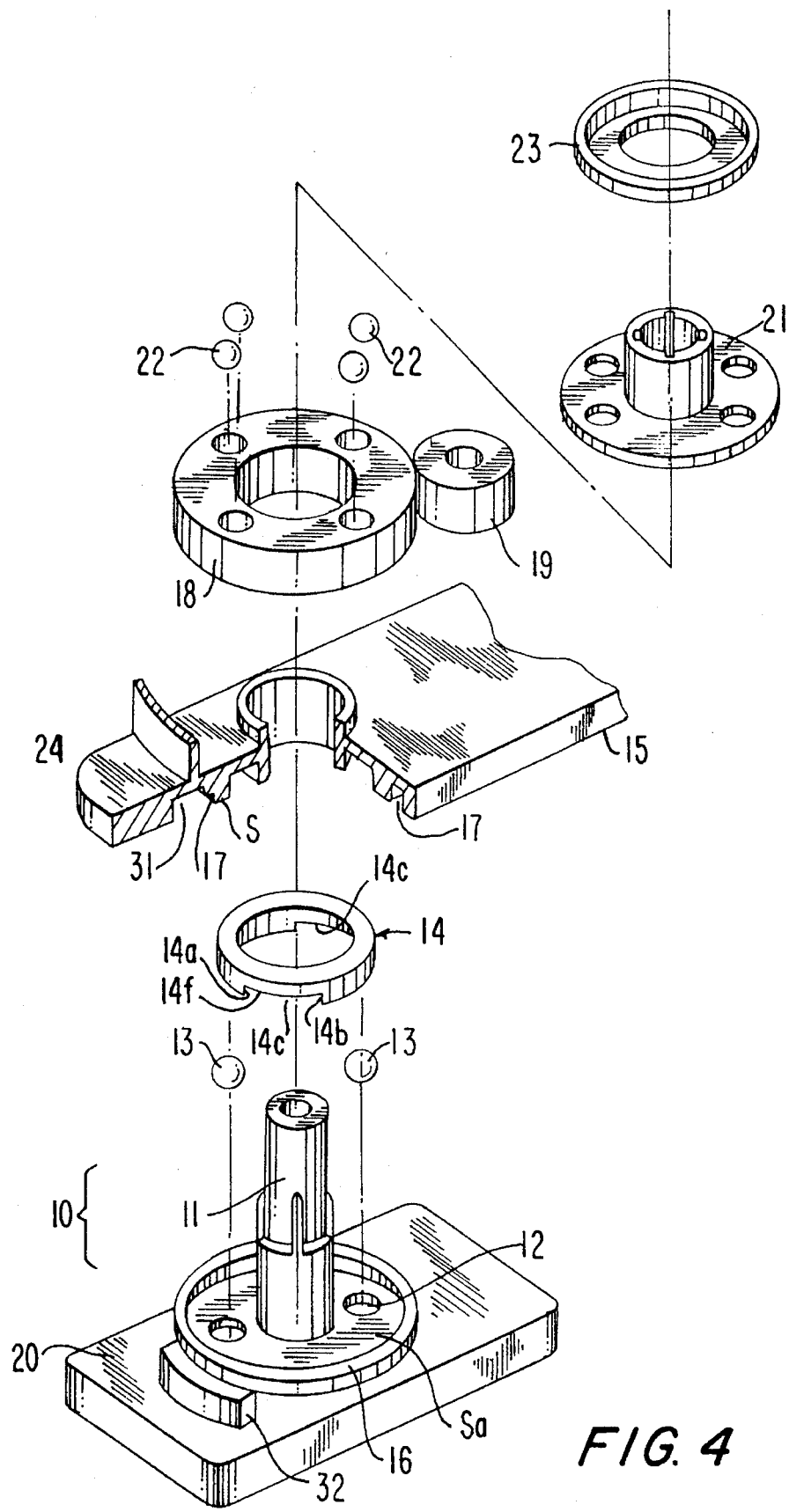
FIG. 4 is an exploded perspective view of the frame supporting portion.

The annular-shaped plate stopper element 14 is placed inside of the annular sliding portion S of the rear surface of the frame root portion 24 and the annular groove 17 is provided on the rear side of the frame root portion 24, bounds the outer periphery of the annular sliding portion S and is coaxial to the shaft (See FIGS. 1 and 4).

A slide surface Sa, a annular rib 16, a shaft stopper element 32 and semi-spherical apertures 12 are provided on the flange portion 20 of the shaft 10. The sliding portion S slides over the slide surface Sa and the annular groove 17 is loosely engaged with the annular rib 16. The shaft stopper element 32 is loosely engaged to contact with the side wall of the arc-shaped groove 31 and balls 13 are retained in the semi-spherical apertures 12.

Rotating means for the mirror body is fixed on the frame 15 and a gear means 19 which is part of the rotating means engages with a gear means 18. The gear means 18 is provided on the cylindrical portion 11 oil the shaft 10 and is designed to provide the desired rotation of the mirror body around the cylindrical portion 11.

Balls 22 are guided by a ball guide element 21 to contact with the gear means 18 and are pressed or urged with a spring element 26 via a lower washer 23 in the direction of the flange portion 20. The other end of the spring element 26 is fixed in position by an upper washer 25 and a plate element 27.

Figure 2:
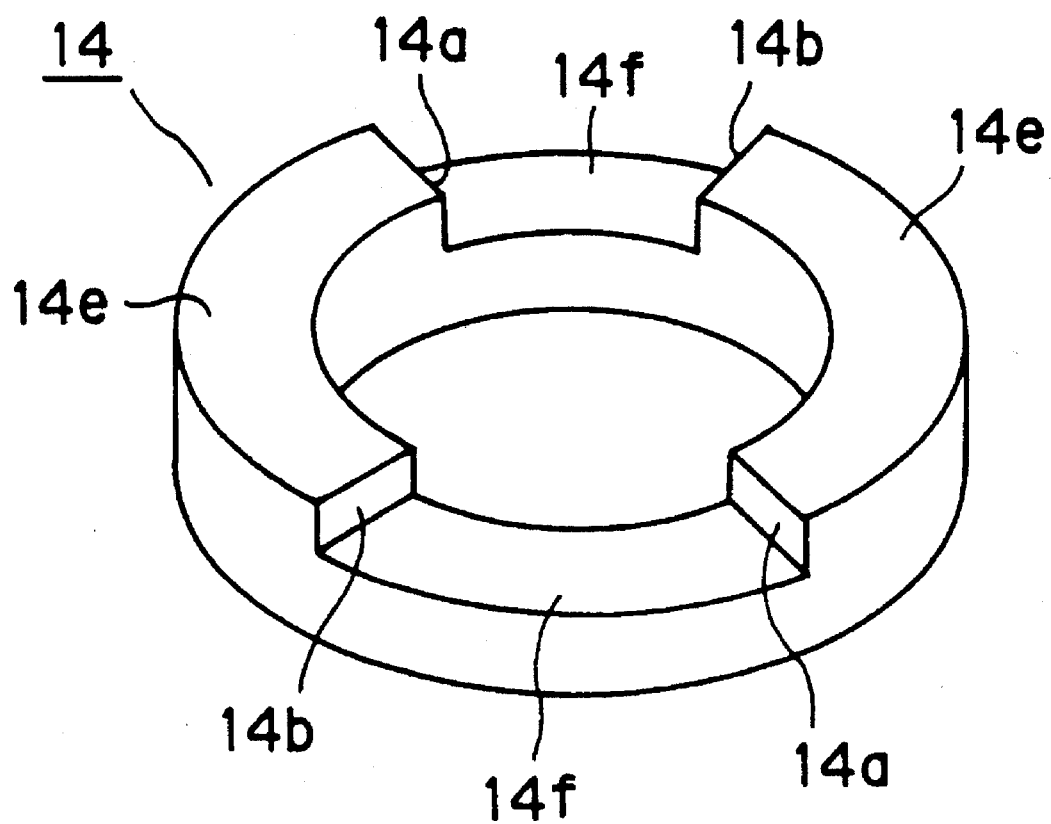
FIG. 2 is a perspective view of a rear side of a plate stop element of the rearview mirror of FIG. 1.

A plate stopper element 14 is illustrated in greater detail by FIG. 2 in which the balls are located in the recesses 14c bounded by the upper surfaces 14e of the stopper element 14. A pair of receses portions 14f are positioned symmetrically around the cylindrical portion 11 and are each bounded by steps 14a, 14b.

The normal position of the mirror body 42 is regulated by the steps 14a,14b for the balls 13 and the recesses 14c of the plate stopper element 14. The forward folded or the backward, folded position is regulated by both the arc-shaped groove 31 of the frame and the shaft stopper element 32.

In the electrically powered foldable outer rearview mirror assembly i described hereinbefore, a locating mechanism is now be described in detail according to FIGS. 3(a)and 3(b).

Balls 13 are provided in the apertures 12 to contact the shaft 10 with the annular plate stopper element 14. FIG. 3 (a) and (b) are a cross-sectional view of the contacting condition of the plate stopper element 14, balls 13 and the flange portion 20 of the shaft 10 . FIG. 3(a) shows that the mirror body 42 is positioned in the normal position when the balls 13 contact with the steps 14a of the recesses 14f. FIG. 3 (b) shows that the mirror body 42 is positioned in a backward position when the balls 13 nearly contact with the other steps 14b.

The motor which is part of the rotating means is engaged with the gear means 19 and is actuated to rotate the gear means 18. The gear means 18 is fixed around the cylindrical portion 11 so that the gear means 19 which is secured on the frame 15 rotates with the frame 15 around the cylindrical portion 11 of the shaft 10.

When the mirror body 42 is positioned in the normal state, that is the steps 14a of the plate stopper element 14 contacts with the balls 13, the motor is electrically cut off to halt the rotation of the frame 15. When the mirror body 42 is positioned in the backward state,that is the shaft stopper element 32 contacts the steps in an arc-shaped groove 31 and, the motor is electrically cut off to halt the rotation of the frame 15. When the outer rearview mirror contacts with the external substance, balls 13 pass over the steps 14a to slide on the upper surface 14e of the plate stopper element 14.

A frame position detecting means 29 detects that the balls 13 contact with the steps difference 14a or the shaft stopper element 32 contacts the steps of the arc-shaped groove 31 so that the motor is stopped. An optical sensor or the like is used for the frame position detecting means 29 capable of stopping the motor after a negligible time lag. It is also possible to detect and control the motor rotation by the optical sensor so that the balls 13 contact with the steps 14a or the like and the motor is stopped.

Figure 3A:
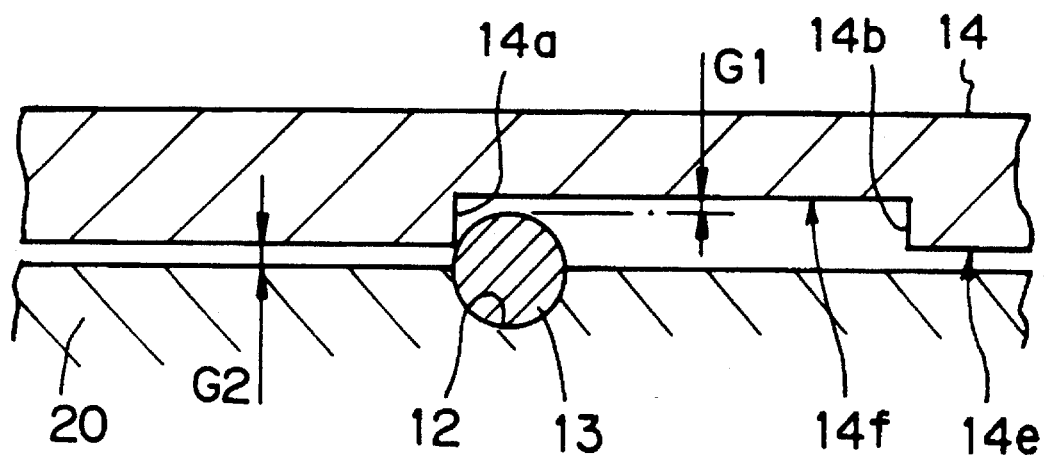
FIG. 3 (a) is a detailed cross-sectional view of a contacting condition of the plate stop element, the ball a shaft of the rearview mirror in a normal position.
Figure 3B:
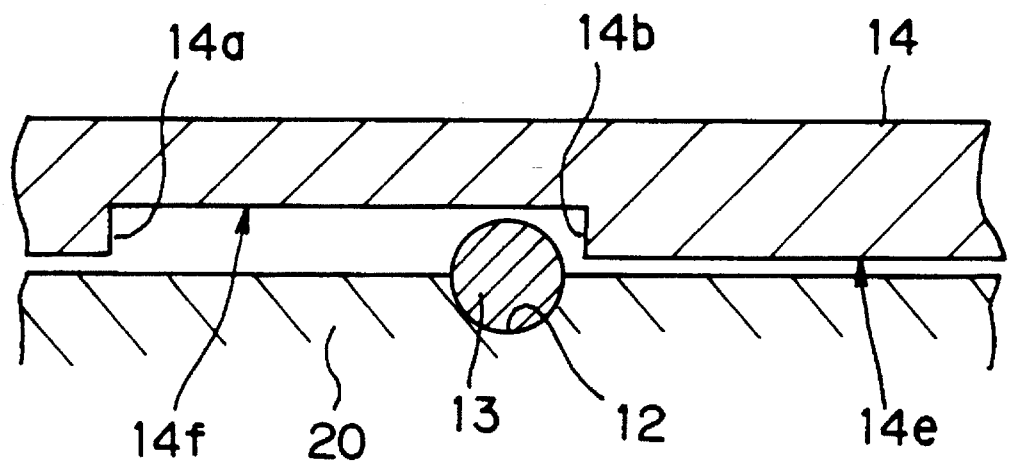

As shown by FIG. 3(a) and 3(b), the clearance G1 and G2 are provided between the top of balls 13 and the recess portions 14f of the plate stopper element 14 and between the upper surface 14e the plate stopper element 14 and the flange 20 of the shaft 10, respectively. The slide surface Sa contacts and slides on the sliding portion S of the shaft 10 to maintain the clearance G1, G2. The friction with the balls 13 and the plate stopper element 14 is prevented to avoid the abrasion of the plate stopper element 14.

The contact of the sliding portion S and the slide surface Sa which provides the bearing surface is such that the frame 15 has improved stability, thus preventing chattering. The inclination of the frame 15 is prevented when balls 13 contact and pass over the steps 14a.

The annular rib 16 is provided protruding from the shaft 10 and the annular groove 17 is loosely engaged therewith so that water and foreign substance, dust or the like, are prevented from entering the groove to achieve the stable rotation of the frame 15.

While the invention has been illustrated and embodied in an electrically powered foldable outer rearview mirror for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed is new and desired to be protected by Letters Patent is set forth in the appended claims.

1. An electrically powered foldable outer rearview mirror comprising:

a base (43);

a shaft (10) mounted on the base, said shaft including a flange portion (20) and a cylindrical portion (11) protruding from the flange portion (20), said flange portion having a slide surface (Sa) ; and a frame (15) engaged rotatably on the cylindrical portion (11) for rotation around the cylindrical portion, said frame (15) having a root portion (24) provided with an annular shaped sliding portion (S) contacting said slide surface (Sa) of said flange portion to slide smoothly around the cylindrical portion (11) of said shaft (10);

wherein said frame is provided with an annular-shaped plate stopper element (14) in a rear surface of the root portion (24) and inside of the sliding portion (S), and said flange portion (20) of the shaft (10) has a shaft stopper element (32) loosely engaged with an arc-shaped groove (31) provided in the rear surface of the frame root portion (24) and balls (13,13) are accommodated in respective semi-spherical apertures (12,12) provided in the flange portion (20) and located so that said balls (13,13) contact said plate stopper element (14); and wherein said shaft (10) includes an annular rib (16) protruding from an upper surface of said flange portion (20) and extending coaxially to the plate stopper element (14) around an outer periphery of the sliding surface (Sa) and said rear surface of the root portion (24) is provided with an annular groove (17) in which said annular rib (16) engages loosely.

2. An electrically powered foldable outer rearview mirror as defined in claim 1 wherein the plate stopper element (14) is ring-shaped and provided with a pair of recesses (14c) forming steps (14a,14b) in said plate stopper element (14), said recesses (14c) being positioned symmetrically in said plate stopper element relative to the cylindrical portion (11) of the shaft (10); and further comprising means for rotating the frame (15) between a normal position of said frame (15) in which said steps (14a,14b) of the plate stopper element (14) contact with the balls (13) and a backward position of said frame (15) in which the shaft stopper element (32) contacts with a groove edge of the arc-shaped groove (31).

3. An electrically powered foldable outer rearview mirror as defined in claim 2, wherein said sliding portion (S) of the rear surface of said root portion (24) has a predetermined height such that a first clearance (G1) between a top of said balls (13) and a bottom surface (14f) of the plate stopper element in the recesses (14c) in the plate stopper element (14) is maintained and a second clearance (G2) between a bottom surface (14e) of the plate stopper element (14) and the flange portion (20) of the shaft (10) is maintained.

* * * * *